Dec. 8, 1953 J. E. BRIDGES 2,662,183

PHASE SHIFT OSCILLATING SYSTEM

Filed April 6, 1950 2 Sheets-Sheet 1

JACK E. BRIDGES
*INVENTOR.*

BY Francis W. Crotty

HIS ATTORNEY

JACK E. BRIDGES
*INVENTOR.*

BY Francis W. Crotty
HIS ATTORNEY

Patented Dec. 8, 1953

2,662,183

UNITED STATES PATENT OFFICE 2,662,183

PHASE SHIFT OSCILLATING SYSTEM

Jack E. Bridges, Chicago, Ill., assignor to Zenith Radio Corporation, a corporation of Illinois Application April 6, 1950, Serial No. 154,375

15 Claims. (Cl. 250—36)

This invention relates to phase-shift oscillating systems and more particularly to such systems as are particularly adapted to use in an automatic-frequency-control arrangement.

Automatic-frequency-control systems find widespread use in present-day commercial television receivers. In particular, it is almost universal practice to provide an automatic-frequency-control system to maintain the line-frequency scanning-signal generator in synchronism with the incoming line-frequency synchronizing-signal pulses, in order to render the receiver substantially insensitive to random noise pulses which may be of substantial magnitude. In accordance with conventional practice, the line-frequency scanning system comprises a sweep-signal generator driven by a local line-frequency automatic-frequency-controlled oscillator. A reactance tube is customarily used to control the operating frequency of the local oscillator in accordance with a direct-current control signal developed by a phase-detector which compares the instantaneous phase of the incoming line-frequency synchronizing-signal pulses with that of the locally-generated line-frequency sweep-signals.

While excellent results are obtained with automatic-frequency-control systems of this type, the local oscillators conventionally used in the prior art necessitate the use of large coils or transformers. These circuit components are expensive and sometimes require a considerable amount of space on the chassis of the receiver.

It is an important object of the present invention to provide a novel phase-shift oscillating system.

It is a further object of the invention to provide a phase-shift oscillating system which is particularly adapted for use as the controlled local oscillator of a wave-signal receiver having an automatic-frequency-control circuit.

It is another object of the invention to provide a novel phase-shift oscillator which is relatively stable and which may be controlled in frequency from a high-impedance source over a wide or narrow range of frequencies with small changes in the control voltage.

Yet another object of the invention is to provide a new and improved phase-shift oscillating system, particularly adaptable for use as the automatic-frequency-controlled oscillator in the line-frequency scanning system of a television receiver or the like, which consists essentially of resistance and capacitance elements and is therefore economical both in cost and in chassis space requirements.

In accordance with the present invention, a phase-shift oscillating system comprises an electron-discharge device having input electrodes and output electrodes and having an output circuit coupled to the output electrodes. A first phase-shifting network is coupled from the output circuit to the input electrodes to apply therebetween a first feedback voltage. A second phase-shifting network, including a self-biased grid-controlled limiter tube, is coupled from the output circuit to the input electrodes to apply therebetween a second feedback voltage of a phase differing from that of the first feedback voltage to cause the system to oscillate at a frequency determined by the phase of the vector resultant of the two feedback voltages.

Further in accordance with the invention, the operating frequency of the oscillating system may be controlled by varying at least one vector characteristic (i. e. either the magnitude or phase) of at least one of the feedback voltages to control the phase of the vector resultant and thereby to determine the operating frequency.

The features of the present invention which are believed to be novel are set forth with particularity in the appended claims. The invention, together with further objects and advantages thereof, may best be understood, however, by reference to the following description taken in connection with the accompanying drawings, in the several figures of which like reference numerals indicate like elements, and in which:

Figure 1:
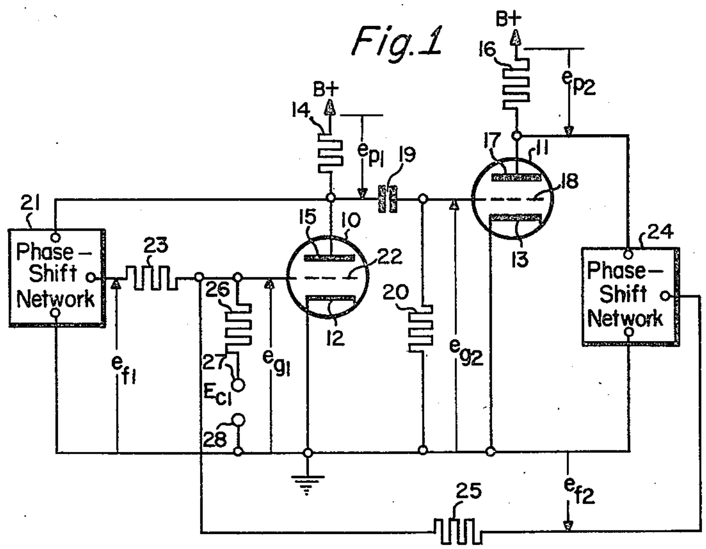
Figure 1 is a schematic representation of a phase-shift oscillating system constructed in accordance with the present invention.

The oscillating system of Figure 1 comprises a pair of electron-discharge devices 10 and 11, the cathodes 12 and 13 of which are respectively connected to ground. A first load impedance 14 is coupled to the anode 15 and to the cathode 12 of the first device 10 through a source of suitable positive unidirectional operating potential, conventionally designated B+. Similarly, a second load impedance 16 is coupled to the anode 17 and to the cathode 13 of the second device 11 through B+. The first load impedance 14 is coupled to the control grid 18 and to the cathode 13 of the second device 11 by means of a passive network comprising a coupling condenser 19 and a grid resistor 20.

In accordance with the invention, a first phase-shifting network 21 is coupled from first load impedance 14 to the control grid 22 and to the cathode 12 of the first device 10, and a resistor 23 is provided between phase-shifting network 21 and control grid 22. Further in accordance with the invention, a second phase-shifting network 24 is coupled from the second load impedance 16 to control grid 22 and to cathode 12 of first device 10 by means including a resistor 25. In order to provide a direct-current return path for control grid 22 of device 10, a grid resistor 26 is connected between control grid 22 and one terminal 27 of a suitable source of operating bias potential $E_{c1}$, the other terminal 28 of the operating bias source being grounded.

Figure 2:
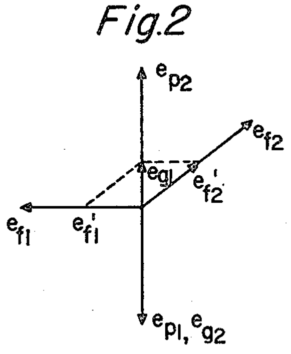
Figure 2 is a vector diagram which is useful in explaining the operation of the system of Figure 1.

The operation of the system of Figure 1 may be readily understood from a consideration of the circuit in connection with the vector diagram shown in Figure 2. Let it be assumed, for purposes of illustration, that a sinusoidal voltage $e_{g1}$ is applied between control grid 22 and cathode 12 of the first device 10. An amplified signal $e_{p1}$ of opposite phase is produced across first load impedance 14. This voltage $e_{p1}$ is transmitted by the passive coupling network 19, 20 substantially without change in amplitude or phase and is applied as an input voltage $e_{g2}$ between control gril 18 and cathode 13 of the second device 11, giving rise to a voltage $e_{p2}$ across second load impedance 16 which is in phase with the original input signal voltage $e_{g1}$.

The voltage $e_{p1}$ appearing across first load impedance 14 is applied to the first phase-shifting network 21 which provides a fixed phase shift to develop an output voltage $e_{f1}$; for purposes of illustration, the voltage $e_{f1}$ has been shown to be substantially 90° behind the voltage $e_{p1}$ appearing across first load impedance 14. This voltage $e_{f1}$ is attenuated by means of resistor 23, and the attenuated voltage is applied between control grid 22 and cathode 12 of first device 10 as a first feedback voltage $e_{f1'}$.

At the same time, the voltage $e_{p2}$ appearing across second load impedance 16 is shifted in phase by network 24 to provide a second voltage $e_{f2}$ which is attenuated by resistor 25 and applied between control grid 22 and cathode 12 of device 10 as a second feedback voltage $e_{f2'}$, which is shown for example to lag $e_{p2}$ by approximately 60°.

As may best be seen from the vector diagram of Figure 2, the two feedback voltages $e_{f1'}$ and $e_{f2'}$ produce a vector resultant equal to $e_{g1}$; consequently, the resultant feedback voltage is of proper magnitude and phase to support oscillation.

Further in accordance with the invention, device 10 is biased for class A operation, and device 11 is self-biased for amplitude-limiting operation; in the illustrated embodiment, device 11 is a self-biased class C amplifier. In other words, device 10 is normally conductive throughout substantially the entire operating cycle, while device 11 is normally conductive throughout only a small portion of each operating cycle, the magnitude of the voltage $e_{p1}$ appearing across first load impedance 14 being sufficiently large to bias device 11 beyond cutoff except during the positive peak of each operating cycle. The voltage appearing across second load impedance 16 then comprises a series of pulses having a repetition frequency equal to the operating frequency of the oscillating system and having an amplitude which is substantially independent of the amplitude of the signal developed across grid resistor 20. Although this voltage is not a sinusoidal one, the analysis of the system is still valid; the pulse train produced across load impedance 16 has a sinusoidal fundamental-frequency component which may be represented by the vector $e_{p2}$.

The operating frequency of the system of Figure 1 may be conveniently controlled by varying the operating bias of control grid 22 with respect to cathode 12 to vary the gain of the first tube 10. Thus, the oscillator may readily be adapted for use in an automatic-frequency-control system by applying the rectified output of a conventional automatic-frequency-control phase-detector between terminals 27 and 28 in the grid circuit of device 10. Variation in the direct-current control signal from the automatic-frequency-control phase-detector effectively varies the magnitude of the first feedback voltage $e_{f1'}$. However, the resulting variations in magnitude of the voltage $e_{p1}$ across first load impedance 14 are not reflected as substantial variations in magnitude or phase of the second feedback voltage $e_{f2'}$ since device 11 is a self-biased amplitude-limiting device. Consequently, any change in the magnitude of the first feedback voltage $e_{f1'}$ causes a change in the phase of the vector resultant of the two feedback voltages $e_{f1'}$ and $e_{f2'}$ and thereby effects a change in the operating frequency. By applying an automatic-frequency-control voltage between terminals 27 and 28 in the proper polarity, the frequency may be caused to shift in the proper sense to maintain the oscillating system in synchronism with the driving signal.

While it is preferred to control the operating frequency of the system by varying the magnitude of the first feedback voltage $e_{f1'}$, since this may readily be achieved by varying the bias of control grid 22, frequency control may be obtained in a more general sense in accordance with the invention by varying the magnitude and/or phase of one or both of the feedback voltages. For example, the phase of the first feedback voltage $e_{f1'}$ may be varied by varying the impedance of one of the elements in the first phase-shifting network 21. The magnitude of the second feedback voltage $e_{f2'}$ may be varied by varying the second load impedance 16, and the phase of the second feedback voltage $e_{f2'}$ may be varied by controlling the impedance of one of the elements of the second phase-shifting network 24. The present invention contemplates frequency control by any or all of these means.

Furthermore, phase-shifting networks 21 and 24 may be constructed either as phase-advancing networks or as phase-retarding networks. As a further alternative, one of the networks 21, 24 may be of the phase-advancing variety while the other provides phase-retardation. In order to obtain the benefits of the invention, the two feedback voltages $e_{f1'}$ and $e_{f2'}$ are of different phase so that a variation in the magnitude and/or phase of at least one of the vectors results in a substantial change in the phase of the vector resultant to control the operating frequency.

Figures 3, 5:
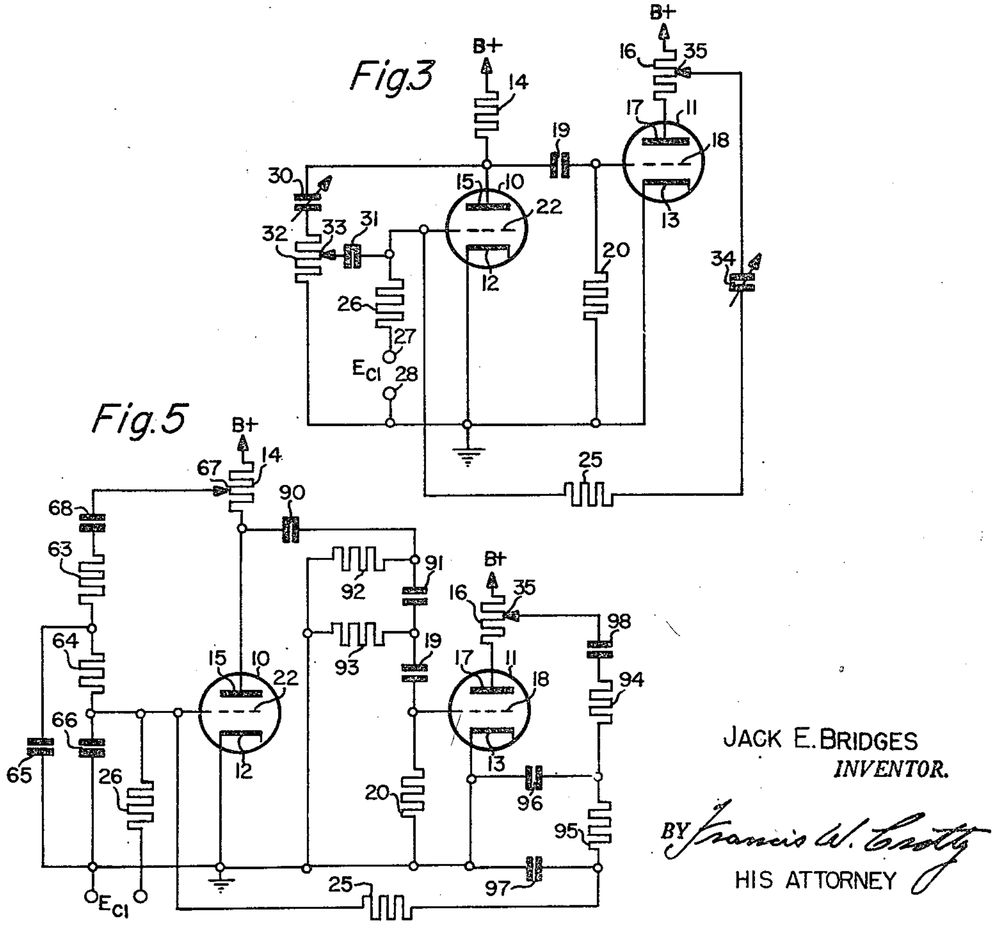
Figure 3 is a schematic diagram of another embodiment of the invention.
Figure 5 is a schematic circuit diagram of still another embodiment of the invention.

The embodiment of Figure 3 represents in schematic form a particular embodiment of the basic circuit of Figure 1 in which the two phase-shifting networks are of the phase-advancing type. The first phase-shifting network comprises a pair of coupling condensers 30 and 31 and a shunt resistor 32 coupled between first load impedance 14 and the control grid 22 and cathode 12 of device 10. In addition to the provision for variation in the operating bias $E_{c1}$ applied to the grid 22 of device 10, the magnitude of the first feedback voltage $e_{f1'}$ may be manually adjusted by means of a variable tap 33 on resistor 32, and the phase of the first feedback voltage $e_{f1'}$ may be manually controlled by adjusting the capacity of condenser 30.

The second phase-shifting network comprises a series condenser 34 coupled between second load impedance 16 and resistor 25. The magnitude of the second feedback voltage $e_{f2'}$ may be manually controlled by means of a variable tap 35 associated with second load impedance 16, and the phase of the second feedback voltage $e_{f2'}$ may be manually adjusted by varying the capacity of condenser 34.

With the arrangement of Figure 3, the phase of the first feedback voltage $e_{f1'}$ is determined by the impedance values of condensers 30 and 31 and resistors 32 and 26, and the phase of the second feedback voltage $e_{f2'}$ is determined by the impedance values of condenser 34 and resistors 25 and 26. While the amount of phase-shift produced by the two feedback networks is not critical, particularly good results have been obtained by adjusting elements 30, 31, 32, and 26 to cause the first feedback voltage $e_{f1'}$ to lead the voltage $e_{p1}$ appearing across load impedance 14 by about 90° and by adjusting elements 34, 25 and 26 to cause the second feedback voltage $e_{f2'}$ to lead the voltage $e_{p2}$ appearing across load impedance 16 by approximately 60°.

Figure 4:
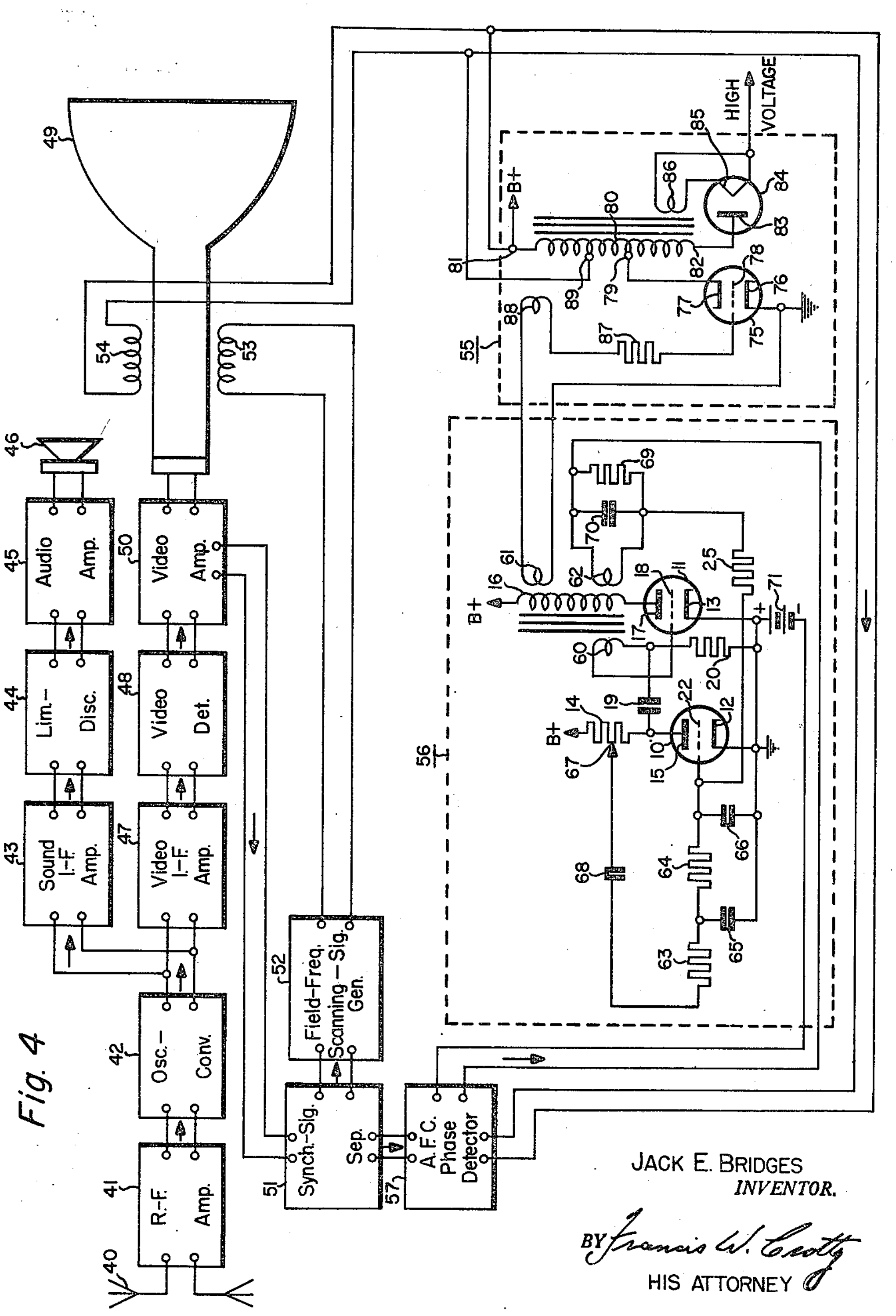
Figure 4 is a schematic circuit diagram of a television receiver embodying a phase-shift oscillating system constructed in accordance with the invention.

Figure 4 is a schematic representation of a television receiver embodying a phase-shift oscillating system constructed in accordance with the invention in the automatic-frequency-control circuit of the line-frequency scanning system. In the receiver of Figure 4, incoming composite television signals are received by an antenna system 40, amplified and selected by a radio-frequency amplifier 41 of one or more stages and converted to intermediate-frequency composite television signals in an oscillator-converter 42. Intermediate-frequency sound signals from oscillator-conveter 42 are amplified by an intermediate-frequency amplifier 43 of one or more stages and are amplitude-limited and detected by a limiter-discriminator 44 to provide audio-frequency signals which are then amplified by an audio-frequency amplifier 45 and applied to a loudspeaker 46 or other sound-reproducing device.

Intermediate-frequency video signals from oscillator-converter 42 are amplified by an intermediate-frequency amplifier 47 of one or more stages and detected by a video detector 48, the resulting composite video signals being applied to the input circuit of a cathode-ray tube 49 or other image-reproducing device after amplification by a video-frequency amplifier 50.

Composite video signals from video-frequency amplifier 50 are applied to a synchronizing-signal separator 51, and field-frequency synchronizing-signal pulses from separator 51 are used to drive a field-frequency scanning-signal generator 52 which supplies the field-frequency scanning coil 53 associated with image-reproducing device 49 with suitable scanning current. Line-frequency scanning current is supplied to the line-frequency scanning coil 54 associated with image-reproducing device 49 by a line-frequency scanning-signal generator 55 which is driven by a line-frequency phase-shift oscillating system 56 constructed in accordance with the present invention. Automatic-frequency-control of the line-frequency scanning-signals is provided by comparing the phase of the scanning signals applied to scanning coil 54 with that of the line-frequency synchronizing-signals from separator 51 in an automatic-frequency-control phase-detector 57, the output of which is utilized to control the operating frequency of phase-shift oscillating system 56.

With the exception of phase-shift oscillating system 56 and line-frequency scanning-signal generator 55, the construction and operation of the receiver is conventional and well known in the art. The sound system is no part of the present invention, and consequently inter-carrier sound or other sound systems may be provided if desired. Moreover, the line-frequency scanning-signal generator may be of more conventional construction if desired, since it has no effect on the operation of the phase-shift oscillator of the present invention.

The phase-shift oscillating system 56 constructed in accordance with the invention comprises a pair of electron-discharge devices 10 and 11 connected in a circuit which is fundamentally similar to that of Figure 1 with the exception that the second load impedance 16 coupled to anode 17 and to cathode 13 of device 11 through B+ comprises the primary winding of a suitable output transformer having three secondary windings 60, 61, and 62. Secondary winding 60 is connected in series between control grid 18 and grid resistor 20 for a purpose hereinafter to be explained, and secondary winding 61 is utilized to derive an output signal from load impedance 16.

The two phase-shift networks are constructed essentially of resistance and capacitance elements and, in the embodiment of Figure 4, are constructed to provide phase-retardation. The first phase-shift network comprises a pair of series resistors 63 and 64 and a pair of shunt condensers 65 and 66, the network being coupled to a variable tap 67 associated with first load impedance 14 by means of a coupling condenser 68. The output of the first phase-shifting network is coupled between control grid 22 and cathode 12 of device 10. The second phase-shifting network, also of the phase-retarding type, comprises the third secondary winding 62 associated with second load impedance 16, a resistor 69 and a condenser 70 being connected in parallel with winding 62. The output of the automatic-frequency-control phase-detector 57 is coupled between ground and the control grid 22 of device 10 through a bias battery 71, resistor 25, and the parallel combination of winding 62, resistor 69, and condenser 70.

The line-frequency scanning-signal generator 55 comprises a bi-directional electron-discharge device 75 having a pair of thermionic cathodes 76 and 77 and an intermediate control grid 78. Cathode 76 is directly connected to ground and cathode 77 is connected to a tap 79 on an output coil 80, one terminal 81 of which is connected to B+. The other terminal 82 of coil 80 is connected to the anode 83 of a diode rectifier 84 the filamentary cathode 85 of which is connected across a secondary winding 86 inductively coupled to coil 80; in this manner, high voltage for application to the final anode of cathode-ray tube 49 is derived from the output of the scanning-signal generator in a manner well known in the art.

Secondary winding 61, inductively coupled to second load impedance 16, is coupled between control grid 78 of device 75 and ground by means of a current-limiting resistor 87 and a tickler winding 88 inductively coupled to coil 80. Line-frequency scanning coils 54 are coupled between B+ and a tap 89 on coil 80 intermediate terminal 81 and tap 79.

In operation, device 10 is normally conductive throughout substantially the entire operating cycle, whereas device 11 is normally conductive only during a small portion of the operating cycle. Secondary winding 60 is loosely coupled to second load impedance 16 and is included in series with the control grid 18 of device 11. The relative polarities of windings 16 and 60 are such that an increase in the potential of anode 17 renders the potential of grid 18 more strongly negative; thus, the inclusion of the feedback winding 60 provides regenerative feedback which serves to sharpen the pulses appearing across impedance 16.

The first phase-shifting network, comprising elements 63, 64, 65, and 66, operates to apply a first feedback voltage, which lags the voltage appearing across first load impedance 14, between control grid 22 and cathode 12 of device 10. At the same time, the second phase-shifting network comprising elements 62, 69, 70 and 25 operates to apply a second feedback voltage, which lags the voltage appearing across second load impedance 16, between control grid 22 and cathode 12 of device 10. The operating frequency is determined by the phase of the vector resultant of the two feedback voltages, as explained above, and the magnitude of the first feedback voltage may be varied by means of tap 67 to set the free-running frequency of phase-shift oscillating system 56 substantially equal to the nominal repetition frequency of the line-frequency synchronizing-signal pulses.

The line-frequency scanning-signal generator 55 is specifically disclosed and claimed in the copending applications of Robert Adler, Serial No. 129,554, filed November 26, 1949, for "Electron-Discharge Device and Circuits," and of Jack E. Bridges, Serial No. 129,671, filed November 26, 1949, for "Self-Sustaining Sawtooth Current Generator," now U. S. Patent 2,591,914 issued April 8, 1952, both assigned to the present assignee. Briefly, the scanning-signal generator 55 comprises an electron-discharge device 75 having a bi-directional electron-discharge path terminated at its ends by thermionic cathodes 76 and 77 respectively. Scanning current of sawtooth waveform is generated by means of the circuit comprising device 75, that portion of output coil 80 between tap 79 and terminal 81, and B+, the current in the circuit reversing direction during each sweep cycle. Tickler coil 88 is inductively coupled to output coil 80, the feedback factor preferably being sufficiently great to insure self-sustaining operation of the generator, in the absence of trigger pulses from the driver stage 56, at a frequency slightly lower than the line-scanning frequency.

Self-sustaining operation of the sweep-signal generator in the absence of trigger pulses from driver stage 56 may be explained briefly as follows. At the end of each sweep cycle, the effective transconductance of control grid 78 with respect to the second cathode 77 increases to such an extent as to cause the system to break into substantially one-half cycle of free oscillation at a frequency determined by the natural resonant frequency of that portion of coil 80 between tap 79 and terminal 81 and its associated distributed capacity (not shown). The large positive-polarity voltage pulse thus produced in the output circuit is reversed in phase and applied in the input circuit as a negative-polarity pulse by means of tickler coil 88 to render device 75 non-conductive. After substantially one-half cycle of free oscillation, the potential of second cathode 77 falls below that of first cathode 76, and the sweep cycle is repeated.

To provide proper synchronization of the scanning-signal generator 55 with the incoming line-frequency synchronizing-signal pulses, output-signal pulses appearing across second load impedance 16 of phase-shift oscillating system 56 are transferred by means of secondary winding 61 to the control grid 78 of device 75 as negative-polarity pulses to initiate flyback at the proper moment. For further details of the construction and operation of line-frequency scanning-signal generator 55, and of the construction of the bi-directional electron-discharge device 75, reference may be had to the above-identified copending applications.

A portion of the output of line-frequency scanning-signal generator 55 is applied to automatic-frequency-control phase-detector 57 for phase comparison with the line-frequency synchronizing-signal pulses from synchronizing-signal separator 51. The automatic-frequency-control phase-detector may be of conventional construction and operates to develop a negative-polarity direct-current control signal which is applied, preferably through an integrating network (not shown), as an operating bias for control grid 22 of first electron-discharge device 10.

The output of a conventional automatic-frequency-control phase-detector may change about one volt for each 100 cycles per second of frequency difference between the two signals being compared, and a direct-current bias voltage of about −8 volts is customary. In practice, it is conventional to design an automatic-frequency-control system in a television receiver to accommodate frequency differences up to about ±1½% of the nominal operating frequency, so that under present-day standards, a direct-current control signal varying from about −5 to −11 volts is required from the automatic-frequency control phase-detector; such an output is readily obtainable. Under these conditions, completely satisfactory operation of the automatic-frequency-control system has been attained by using the following circuit constants for the phase-shift oscillating system 56 shown in Figure 4:

| | |
|---|---|
| Nominal operating frequency | 15,750 cycles per second |
| Electron-discharge devices 10 and 11 | A duplex triode type 6SN7 |
| Resistor 14 | 50,000 ohms |
| Condenser 19 | 400 micro-microfarads |
| Resistor 20 | 150,000 ohms |
| Condenser 68 | .02 micro-farad |
| Resistor 63 | 47,000 ohms |
| Resistor 64 | 150,000 ohms |
| Condenser 65 | 200 micro-microfarads |
| Condenser 66 | 50 micro-microfarads |
| Coil 16 | 14 millihenries |
| Coil 61 | 4 millihenries |
| Coil 62 | 4 millihenries |
| Resistor 69 | 1,500 ohms |
| Condenser 70 | .03 micro-farad |
| B+ | 250 volts |

Suitable operating constants for the line-frequency scanning-signal generator 55 are set forth by way of illustration in the above-identified copending applications.

In all of the embodiments of the invention, the stability of the system depends largely on the degree to which the second feedback voltage enapproaches a sinusoidal wave. The voltage $e_{p2}$ developed across second load impedance 16 consists of a series of negative-polarity pulses, since device 11 is self-biased for class C operation. Thus, sinusoidal or near-sinusoidal waveform of the second feedback voltage $e_{f2'}$ may only be obtained by sufficient filtering in the feedback loop of the harmonic components of the voltage $e_{p2}$ developed across second load impedance 16. If no filtering is provided, the system tends to oscillate at a lower frequency determined by the time constants of the various circuits involved, in a manner analogous to multivibrator operation. Consequently, it is desirable to provide as much filtering as practicable for the second feedback voltage.

In the embodiment of Figure 4, ample filtering is provided by using a tuned circuit in the second feedback loop. There is illustrated in Figure 5 a further embodiment of the invention in which efficient filtering of the second feedback voltage is obtained with resistance and capacitance elements exclusively. In the circuit of Figure 5, a phase-advancing network, comprising series condensers 90 and 91 and shunt resistors 92 and 93, is included in the coupling means between first load impedance 14 and control grid 18 of device 11. This network provides a substantial amount of phase-advance between anode 15 of device 10 and control grid 18 of device 11; merely by way of example, condensers 90 and 91 and resistors 92 and 93 may be proportioned to provide a phase-advance at the operating frequency of substantially 90°. In addition, this network operates as a high-pass filter to eliminate low-frequency components which otherwise would tend to establish multivibrator operation at a frequency determined by the time constants of the system. Coupling condenser 19 and grid resistor 20 are proportioned to provide a relatively large time constant and serve only to provide self-bias for control grid 18 of device 11.

The first feedback network from load impedance 14 to control grid 22 and cathode 12 of device 10 is a phase-retarding network comprising resistors 63 and 64 and condensers 65 and 66 and is substantially identical to that illustrated in the embodiment of Figure 4 and may, for example, provide a phase-retardation of substantially 90°. In the embodiment of Figure 5, the phase-shifting network from second load impedance 16 to control grid 22 and cathode 12 of device 10 also comprises a phase-retarding circuit including series resistors 94, 95 and 25 and shunt condensers 96, 97, and 66; a blocking condenser 98 is also provided between tap 35 and resistor 94. In accordance with the invention, the second feedback network, comprising resistors 94, 95 and 25 and condensers 96, 97 and 66, is constructed and arranged to provide a phase-retardation which is greater at the operating frequency than the amount of phase-advance provided by the interstage coupling network, so that the second feedback voltage $e_{f2}$, applied between control grid 22 and cathode 12 of device 10 is of a phase differing from that of the first feedback voltage $e_{f2'}$ applied therebetween by means of the first feedback network. In this manner, the operating frequency is determined by the phase of the vector resultant as before; however, the provision of phase-advance in the interstage coupling network permits the use of a larger number of filter sections in the second feedback network from second load impedance 16 to control grid 22. Thus, the circuit of Figure 5 provides greater integration than the embodiment of Figure 3, for example, so that the waveform of the second feedback voltage and, consequently, the frequency stability of the system are substantially improved.

In its broader sense, therefore, the invention contemplates a phase-shift oscillating system comprising an electron-discharge device 10 having input electrodes 22 and 12 and output electrodes 15 and 12, and having an output circuit 14 coupled to the output electrodes. Two feedback networks are coupled from output circuit 14 to input electrodes 22 and 12 to provide a pair of feedback voltages of different phases, so that the frequency of the system is determined by the phase of the vector resultant of the two feedback components. An amplitude-limiting device 11 is included in the second feedback path to maintain the magnitude of the second feedback voltage substantially constant, so that frequency control of the system may be obtained by varying at least one vector characteristic of the first feedback voltage. The second phase-shifting network may be coupled in either the input circuit or the output circuit of the amplitude-limiting device, or part of the phase-shift for the second feedback voltage may be provided in both input and output circuits.

In all of the illustrated embodiments of the invention, the type of amplitude-limiting device used is a grid-bias limiter or self-biased class C amplifier. An amplitude-limiting device of this type is particularly useful in circuits wherein it is desired to obtain an output voltage in the form of a series of discrete pulses. However, the invention is not restricted to the use of an amplitude-limiting device of this type, and different output waveforms may be obtained by using other types of amplitude-limiters.

Upon casual inspection of the schematic circuit diagrams set forth in the drawings to illustrate the invention, one might infer that the large number of components shown would result in a relatively high circuit cost. As a practical matter, however, low-cost distributed-constant resistance-capacitance transmission lines, such as ceramic integrating networks, may be used in place of the lumped-constant elements shown to provide the desired phase-shift of each of the feedback voltages, so that the cost of the overall system may be comparable to, or even lower than, that of a conventional automatic-frequency control oscillator.

Thus the present invention provides a new and improved phase-shift oscillating system for providing any desired type output waveform with high stability. Furthermore, the system is inexpensive and is particularly adaptable to frequency control from a high-impedance source; hence it lends itself to ready use in an automatic-frequency-control system such as that employed in a television receiver or the like.

While particular embodiments of the present invention have been shown and described, it is apparent that various changes and modifications may be made, and it is therefore contemplated in the appended claims to cover all such changes and modifications as fall within the true spirit and scope of the invention.

I claim:

1. A phase-shift oscillating system comprising: an electron-discharge device having input electrodes and output electrodes; an output circuit coupled to said output electrodes; a first phase-shifting network coupled from said output circuit to said input electrodes to apply therebetween a first feedback voltage; and a second phase-shifting network, including a self-biased grid-controlled limiter tube, coupled from said output circuit to said input electrodes to apply therebetween a second feedback voltage of a phase differing from that of said first feedback voltage to cause said system to oscillate at a frequency determined by the phase of the vector resultant of said first and second feedback voltages.

2. A phase-shift oscillating system comprising: an electron-discharge device having input electrodes and output electrodes; an output circuit coupled to said output electrodes; a first phase-shifting network coupled from said output circuit to said input electrodes to apply therebetween a first feedback voltage; a second phase-shifting network, including a self-biased grid-controlled limiter tube, coupled from said output circuit to said input electrodes to apply therebetween a second feedback voltage of a phase differing from that of said first feedback voltage to cause said system to oscillate at a frequency determined by the phase of the vector resultant of said first and second feedback voltages; and means for varying at least one vector characteristic of said first feedback voltage to control the operating frequency of said oscillating system.

3. A phase-shift oscillating system comprising: an electron-discharge device having input electrodes and output electrodes; an output circuit coupled to said output electrodes; a first phase-shifting network coupled from said output circuit to said input electrodes to apply therebetween a first feedback voltage; a second phase-shifting network, including a self-biased grid-controlled limiter tube, coupled from said output circuit to said input electrodes to apply therebetween a second feedback voltage of a phase differing from that of said first feedback voltage to cause said system to oscillate at a frequency determined by the phase of the vector resultant of said first and second feedback voltages; and means for varying the magnitude of said first feedback voltage to control the operating frequency of said oscillating system.

4. A phase-shift oscillating system comprising: an electron-discharge device having input electrodes and output electrodes; an output circuit coupled to said output electrodes; a first phase-shifting network coupled from said output circuit to said input electrodes to apply therebetween a first feedback voltage; a second phase-shifting network, including a self-biased grid-controlled limiter tube, coupled from said output circuit to said input electrodes to apply therebetween a second feedback voltage of a phase differing from that of said first feedback voltage to cause said system to oscillate at a frequency determined by the phase of the vector resultant of said first and second feedback voltages; and means for varying the gain of said electron-discharge device to control the operating frequency of said oscillating system.

5. A phase-shift oscillating system comprising: an electron-discharge device having input electrodes and output electrodes; an output circuit coupled to said output electrodes; a first phase-shifting network coupled from said output circuit to said input electrodes to apply therebetween a first feedback voltage; a second phase-shifting network coupled from said output circuit to said input electrodes to apply therebetween a second feedback voltage of a phase differing from that of said first feedback voltage to cause said system to oscillate at a frequency determined by the phase of the vector resultant of said first and second feedback voltages; a self-biased grid-controlled limiter tube included in said second phase-shifting network for maintaining the magnitude of said second feedback voltage substantially constant and independent of the vector characteristics of the voltage appearing across said output circuit; and means for varying at least one vector characteristic of said first feedback voltage to control the operating frequency of said oscillating system.

6. A phase-shift oscillating system comprising: a pair of electron-discharge devices each having a cathode, a control grid, and an anode; a first load impedance coupled to the anode and to the cathode of one of said devices; a second load impedance coupled to the anode and to the cathode of the other of said devices; a network coupling said first load impedance to the grid and to the cathode of said other device; a first phase-shifting network coupled from said first load impedance to the control grid and to the cathode of said one device to apply therebetween a first feedback voltage; a second phase-shifting network coupled from said second load impedance to the grid and to the cathode of said one device to apply therebetween a second feedback voltage of a phase differing from that of said first feedback voltage to cause said system to oscillate at a frequency determined by the phase of the vector resultant of said first and second feedback voltages; and means for deriving an output signal from one of said devices.

7. A phase-shift oscillating system comprising: a pair of electron-discharge devices each having a cathode, a control grid, and an anode; a first load impedance coupled to the anode and to the cathode of one of said devices; a second load impedance coupled to the anode and to the cathode of the other of said devices; a passive network coupled from said first load impedance to the grid and to the cathode of said other device and consisting essentially of resistance and capacitance elements; a first phase-shifting network coupled from said first load impedance to the control grid and to the cathode of said one device to apply therebetween a first feedback voltage; a second phase-shifting network coupled from said second load impedance to the grid and to the cathode of said one device to apply therebetween a second feedback voltage of a phase differing from that of said first feedback voltage to cause said system to oscillate at a frequency determined by the phase of the vector resultant of said first and second feedback voltages; and means for deriving an output signal from one of said devices.

8. A phase-shift oscillating system comprising: a pair of electron-discharge devices each having a cathode, a control grid, and an anode; a first load impedance coupled to the anode and to the cathode of one of said devices; a second load impedance coupled to the anode and to the cathode of the other of said devices; a passive network coupled from said first load impedance to the grid and to the cathode of said other device; a first phase-retarding network coupled from said first load impedance to the control grid and to the cathode of said one device to apply therebetween a first feedback voltage; a second phase-retarding network coupled from said second load impedance to the grid and to the cathode of said one device to apply therebetween a second feedback voltage of a phase differing from that of said first feedback voltage to cause said system to oscillate at a frequency determined by the phase of the vector resultant of said first and second feedback voltages; and means for deriving an output signal from one of said devices.

9. A phase-shift oscillating system comprising: a pair of electron-discharge devices each having a cathode, a control grid, and an anode; a first load impedance coupled to the anode and to the cathode of one of said devices; a second load impedance coupled to the anode and to the cathode of the other of said devices; a network coupling said first load impedance to the grid and to the cathode of said other device; a first phase-shifting network consisting essentially of resistance and capacitance elements coupled from said first load impedance to the control grid and to the cathode of said one device to apply therebetween a first feedback voltage; a second phase-shifting network consisting essentially of resistance and capacitance elements coupled from said second load impedance to the grid and to the cathode of said one device to apply therebetween a second feedback voltage of a phase differing from that of said first feedback voltage to cause said system to oscillate at a frequency determined by the phase of the vector resultant of said first and second feedback voltages; and means for deriving an output signal from one of said devices.

10. A phase-shift oscillating system comprising: a pair of electron-discharge devices each having a cathode, a control grid, and an anode; a first load impedance coupled to the anode and to the cathode of one of said devices; a second load impedance coupled to the anode and to the cathode of the other of said devices; a network coupling said first load impedance to the grid and to the cathode of said other device; a first phase-shifting network coupled from said first load impedance to the control grid and to the cathode of said one device to apply therebetween a first feedback voltage; a second phase-shifting network coupled from said second load impedance to the grid and to the cathode of said one device to apply therebetween a second feedback voltage of a phase differing from that of said first feedback voltage to cause said system to oscillate at a frequency determined by the phase of the vector resultant of said first and second feedback voltages; means for varying at least one vector characteristic of at least one of said feedback voltages to control the phase of said vector resultant and the operating frequency of said system; and means for deriving an output signal from one of said devices.

11. A phase-shift oscillating system comprising: a pair of electron-discharge devices each having a cathode, a control grid, and an anode; a first load impedance coupled to the anode and to the cathode of one of said devices; a second load impedance coupled to the anode and to the cathode of the other of said devices; a passive network coupled from said first load impedance to the grid and to the cathode of said other device; a first phase-shifting network coupled from said first load impedance to the control grid and to the cathode of said one device to apply therebetween a first feedback voltage; a second phase-shifting network coupled from said second load impedance to the grid and to the cathode of said one device to apply therebetween a second feedback voltage of a phase differing from that of said first feedback voltage to cause said system to oscillate at a frequency determined by the phase of the vector resultant of said first and second feedback voltages; means for varying the magnitude of said first feedback voltage to control the phase of said vector resultant and the operating frequency of said system; and means for deriving an output signal from one of said devices.

12. A phase-shift oscillating system comprising: a pair of electron-discharge devices each having a cathode, a control grid, and an anode; a first load impedance coupled to the anode and to the cathode of one of said devices; a second load impedance coupled to the anode and to the cathode of the other of said devices; a passive network coupled from said first load impedance to the grid and to the cathode of said other device; a first phase-shifting network coupled from said first load impedance to the control grid and to the cathode of said one device to apply therebetween a first feedback voltage; a second phase-shifting network coupled from said second load impedance to the grid and to the cathode of said one device to apply therebetween a second feedback voltage of a phase differing from that of said first feedback voltage to cause said system to oscillate at a frequency determined by the phase of the vector resultant of said first and second feedback voltages; means for varying the bias of said one device to vary the magnitude of said first feedback voltage thereby to control the phase of said vector resultant and the operating frequency of said system; and means for deriving an output signal from one of said devices.

13. A phase-shift oscillating system comprising: a pair of electron-discharge devices each having a cathode, a control grid, and an anode; a first load impedance coupled to the anode and to the cathode of one of said devices; a second load impedance coupled to the anode and other cathode of the other of said devices; a passive phase-advancing network coupled from said first load impedance to the grid and to the cathode of said other device; a first phase-retarding network coupled from said first load impedance to the control grid and to the cathode of said one device to apply therebetween a first feedback voltage; and a second phase-retarding network coupled from said second load impedance to the grid and to the cathode of said one device to apply therebetween a second feedback voltage of a phase differing from that of said first feedback voltage to cause said system to oscillate at a frequency determined by the phase of the vector resultant of said first and second feedback voltages.

14. In a signal-translating system: a phase-shift oscillating system comprising a pair of electron-discharge devices each having a cathode, a control grid, and an anode, a first load impedance coupled to the anode and to the cathode of one of said devices, a second load impedance coupled to the anode and to the cathode of the other of said devices, a network coupling said first load impedance to the grid and to the cathode of said other device, a first phase-shifting network coupled from said first load impedance to the control grid and to the cathode of said one device to apply therebetween a first feedback voltage, a second phase-shifting network coupled from said second load impedance to the grid and to the cathode of said one device to apply therebetween a second feedback voltage of a phase differing from that of said first feedback voltage to cause said system to oscillate at a frequency determined by the phase of the vector resultant of said first and second feedback voltages, and means for deriving an output signal from one of said devices; a source of a first periodic signal having a predetermined nominal frequency substantially equal to the free-running frequency of said oscillating system; a phase-detector coupled to said source and to said system for developing a direct-current control signal which varies in magnitude in accordance with the instantaneous phase-difference between said first signal and said output signal; and means for utilizing said direct-current control signal to vary at least one vector characteristic of at least one of said feedback voltages to control the phase of said vector resultant in a sense to maintain said oscillating system substantially in synchronism with said first signal.

15. In a television receiver: a phase-shift oscillating system comprising a pair of electron-discharge devices each having a cathode, a control grid, and an anode, a first load impedance coupled to the anode and to the cathode of one of said devices, a second load impedance coupled to the anode and to the cathode of the other of said devices, a passive network coupled from said first load impedance to the grid and to the cathode of said other device, a first phase-shifting network coupled from said first load impedance to the control grid and to the cathode of said one device to apply therebetween a first feedback voltage, a second phase-shifting network coupled from said second load impedance to the grid and to the cathode of said one device to apply therebetween a second feedback voltage of a phase differing from that of said first feedback voltage to cause said system to oscillate at a frequency determined by the phase of the vector resultant of said first and second feedback voltages, and means for deriving an output signal from one of said devices; a source of periodic synchronizing-signal pulses of a predetermined nominal repetition frequency substantially equal to the free-running frequency of said oscillating system; an automatic - frequency - control phase - detector coupled to said source and to said oscillating system for developing a direct-current control signal which varies in magnitude in accordance with the instantaneous phase-difference between said synchronizing-signal pulses and said output signal; and means for controlling the bias of said one device in accordance with said control signal to control the phase of said vector resultant in a sense to maintain said oscillating system substantially in synchronism with said synchronizing-signal pulses.

JACK E. BRIDGES.

References Cited in the file of this patent

UNITED STATES PATENTS

| Number | Name | Date |
|---|---|---|
| 2,173,427 | Scott | Sept. 19, 1939 |
| 2,346,396 | Rider | Apr. 11, 1944 |
| 2,375,273 | Black | May 8, 1945 |
| 2,386,892 | Hadfield | Oct. 6, 1945 |
| 2,441,567 | Darlington | May 18, 1948 |
| 2,451,858 | Mork | Oct. 19, 1948 |
| 2,568,868 | Pratt | Sept. 25, 1951 |